Jan. 8, 1952  J. H. LINE  2,582,048
SPECTACLE LENS LAYOUT DEVICE
Filed Feb. 26, 1947  2 SHEETS—SHEET 1
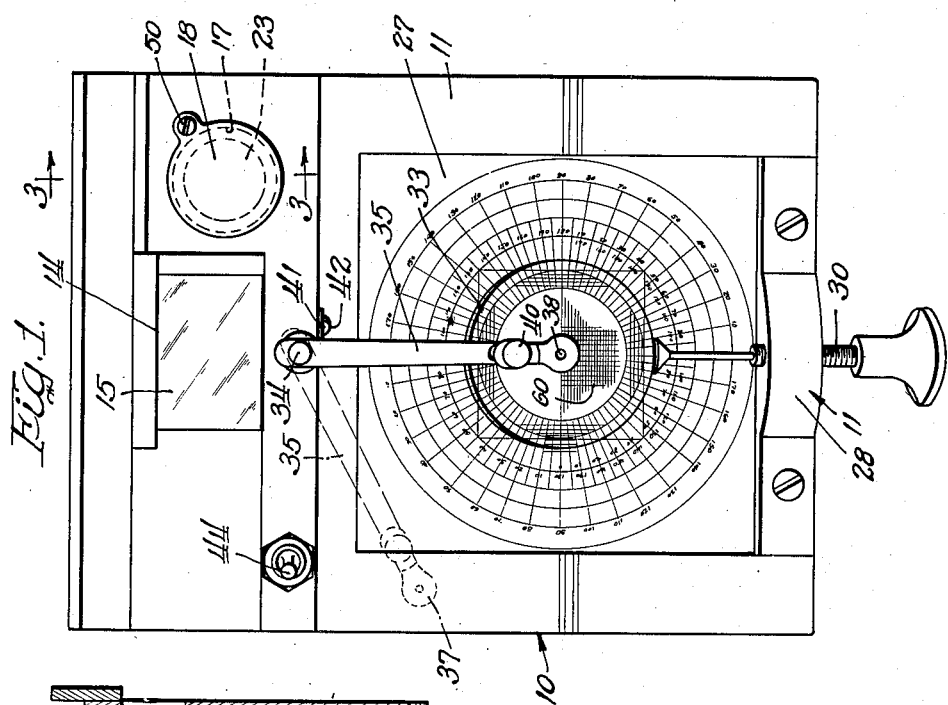
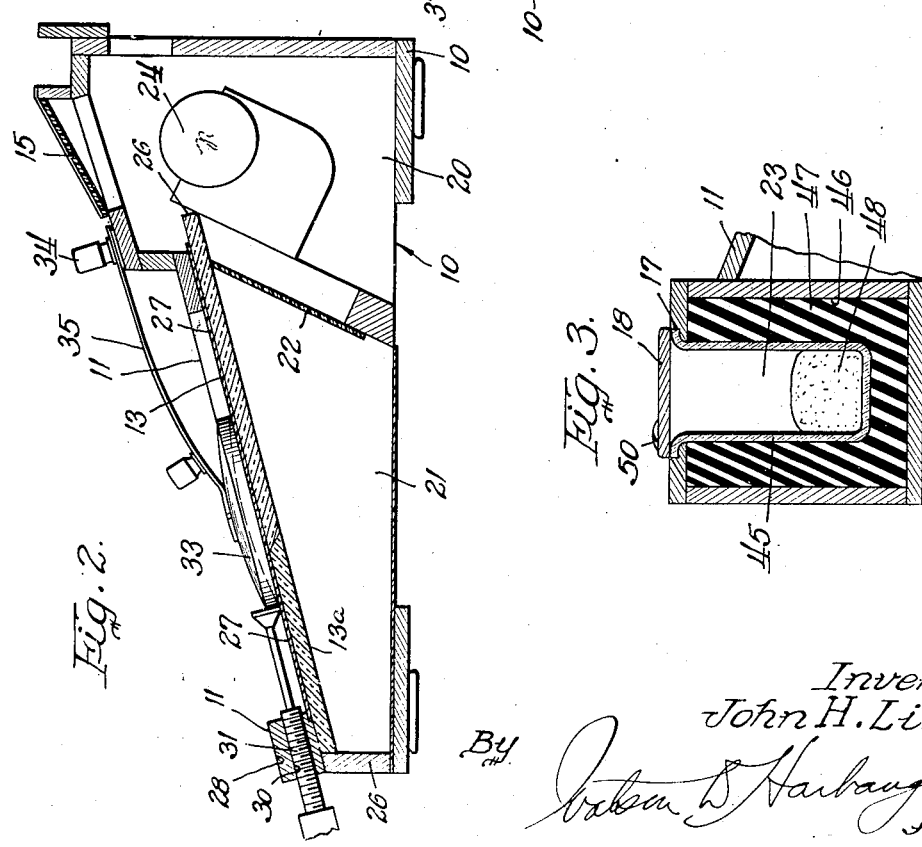
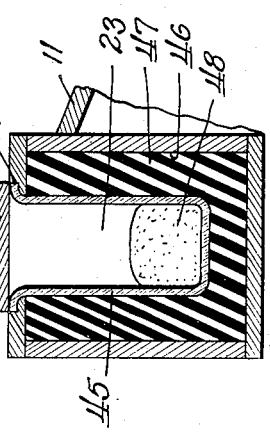
Inventor:
John H. Line.
By
Attÿ.

Jan. 8, 1952     J. H. LINE     2,582,048
SPECTACLE LENS LAYOUT DEVICE
Filed Feb. 26, 1947     2 SHEETS—SHEET 2
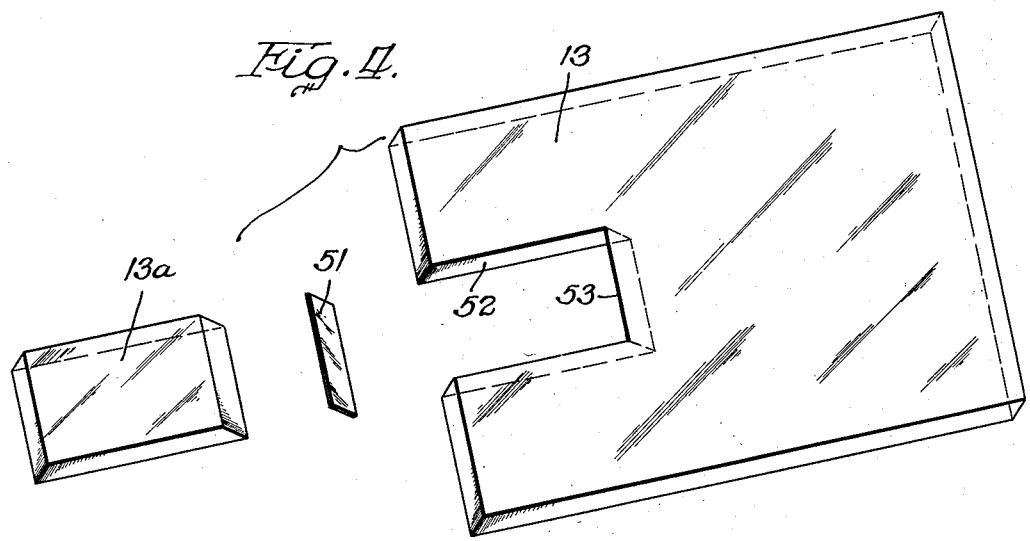
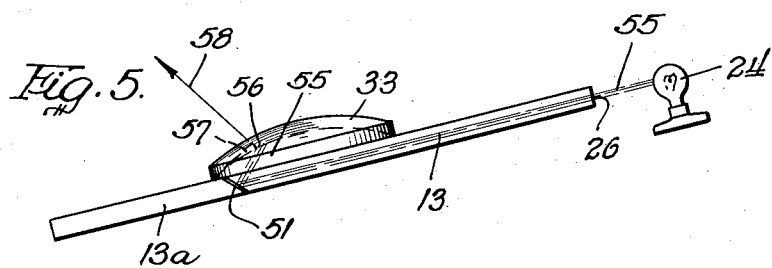
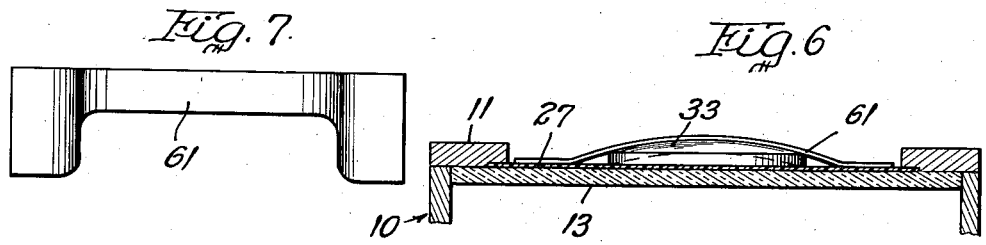
Inventor:
John H. Line.

Patented Jan. 8, 1952

2,582,048

UNITED STATES PATENT OFFICE 2,582,048

SPECTACLE LENS LAYOUT DEVICE

John H. Line, Riverdale, Ill.

Application February 26, 1947, Serial No. 731,070

4 Claims. (Cl. 88—56)

This invention relates generally to protractors employed in laying out guide markings on spectacle lenses prior to grinding, and more particularly to an improved protractor device for use in the laying out of bifocal as well as ordinary lenses.

Spectacle lenses are generally formed from lens blanks which are ground to a shape corresponding to a prescription furnished by an optometrist or oculist to the lens grinding establishment. The lens blanks comprise a polished piece of glass of uniform thickness having a spherical convex surface and a spherical concave surface, the radii of curvature of the two surfaces differing by the thickness of the blank so that light passing through the lens is not diverted from its path and the lens blank neither magnifies nor diminishes. In practice, the concave surface, which will ultimately be adjacent the spectacle wearer's eye, is ground to the contour directed by the prescription while the convex outer surface is left untouched.

The optical defects of the eye may be enumerated as follows: (1) myopia or nearsightedness, (2) hypermetropia or farsightedness, and (3) astigmatism where objects seen are distorted in shape. Astigmatism may and frequently does occur simultaneously with myopia or with hypermetropia. Myopia and hypermetropia are usually due to a cornea having too great or too small a radius of curvature while astigmatism is usually due to different portions of the cornea having unequal curvature.

Myopia and hypermetropia are corrected by employing, respectively, either a diverging or converging spectacle lens while astigmatism must be corrected by a cylindrical lens. When astigmatism occurs simultaneously with myopia or hypermetropia, a cylindrical lens which is also diverging or converging must be employed.

To serve as a guide to the lens grinder during the grinding operation, various lines and notations are inscribed on the convex surface of the blank prior to grinding. Among these are angular lines extending across the lens surface and passing through the center of the lens. These latter lines are used in determining the axis of the cylindrical lens for the correction of astigmatism. The markings are usually inscribed on the glass surface with a special marking ink applied by means of a small stick of orangewood. To aid in properly laying out the blank, it is set on top of a special protractor convex side up with the center of the blank over the center of the protractor and the lines are laid out with a small flexible ruler laid on top of the blank. After the lens is ground, a similar protractor is used to lay out lines to be used in trimming the circular blank to the required periphery. Prior to grinding, but after preliminary marking, the blanks are cemented to circular steel holders using pitch as a cement, the marked convex side being adjacent the holder.

Bifocal lenses are usually formed from special blanks which are similar to those described except that the portion of the blank which is to become the secondary or "bifocal" lens has an insert piece of a glass having a higher refractive index fused into it. The blanks are prepared by grinding a depression into the concave side of the blank, inserting a slug of the higher index glass into the depression, and heating the whole blank to a temperature just sufficient to cause the insert slug to melt and become fused integrally to the blank but not sufficient to melt the blank itself. For this reason it is difficult to discern the boundaries of the bifocal portion of a lens or blank particularly when the refractive index of the bifocal portion is close to that of the blank proper, for there is no actual line of demarkation between the two portions but only a difference in the light refracting properties of the two.

Consequently, in the past, difficulties have been experienced in accurately laying out the blanks in the grinding and edge cutting of bifocal lenses, resulting in inferior spectacles being produced. The bifocal portion of a lens must be precisely located according to the lens prescription in order that it will be in the proper position with respect to the spectacle wearer's eye and more important in order that the contours of the concave side of the lens will be proper over each of the two lens elements.

One object of this invention, therefore, is to provide a protractor which will increase the accuracy of laying out a lens blank for a bifocal lens.

A second object is to provide an illuminated protractor illuminated in such a manner as to indicate the outline of the bifocal portion of the lens, particularly the top edge of that portion.

Another object is to provide a protractor device having a means for indicating the exact center of the lens blank.

Another object is to provide a protractor device having an auxiliary green lighted screen for determining the outline of the bifocal portion of a lens.

A further object is to provide a protractor device having a micrometer adjustment for locating a lens blank properly with respect to the protractor.

A further object is to provide a protractor device in which a removable transparent protractor card is employed so that different cards may be inserted for different layout problems.

Other and additional objects will be apparent to those familiar with the art on examination of the drawings, the specification and the appended claims.

In the drawings:

Fig. 1 is a top view of the protractor device of this invention.

Fig. 2 is a vertical section of the device of Fig. 1.

Fig. 3 is a vertical section taken on line 3—3 of Fig. 1.

Fig. 4 is an expanded view of the protractor supporting screen.

Fig. 5 is an assembled view of the screen of Fig. 4 having a lens blank thereon and diagrammatically indicating the path of light rays therethrough.

Fig. 6 is a vertical section showing the screen, lens blank and ruler.

Fig. 7 is an enlarged top view of the ruler of Fig. 6.

The protractor device as shown in Fig. 1 is housed in a substantially rectangular box 10 having an inclined top 11 as shown in Fig. 2. The angle of inclination is preferably about 15° to the horizontal as shown but may be varied somewhat to suit the needs of a person using the device. This box 10 is formed preferably of wood or plastic either by cementing various pieces together as shown or by molding. The major portion of the inclined top surface 11 of the box 10 is open to receive a transparent screen 13 of "Lucite" or "Plexiglass" or other transparent plastic material. The remainder of the top portion 11 has an opening 14 in which a second screen 15 preferably of green colored transparent plastic material is received. This screen 15 is preferably inclined at a slightly greater angle than the first screen 13 so that it will lie on a plane normal to the line of vision of a person using the device as does the first screen 13. The second opening 17 is covered by a removable lid 18 for receiving an inkwell. The interior of the box 10 is divided into two compartments 20 and 21 by another green colored screen 22 of the same material, as shown in Fig. 2. The smaller of these compartments 20 is occupied by the inkwell 23 and also contains a lamp bulb 24 disposed so that the maximum of light may pass through the two screens 15 and 22. The large screen 13 extends from the front wall 26 of the box 10 upwardly and rearwardly to a point adjacent the light bulb 24 passing beyond the inclined interior filter screen 22. The underside of the screen 13 is frosted either by etching or mechanical abrasion so as to better receive light impinging on this surface regardless of the angle at which the light beams impinge. The rear edge 26 of this screen 13 is polished and located adjacent the light bulb 24 so as to pick up as much light as possible.

The entire exposed area of the screen 13 is covered by a protractor card 27 as shown in Figs. 1 and 6. The front edge 28 of the top 11 is removable so that this card which slips in between the screen and the side members may be removed and replaced by other protractor cards depending on the particular layout requirements. This removable edge 28 is also provided with a threaded hole 30 which receives a micrometer adjusting screw 31 for locating the lens blank 33 with respect to the card 27. Opposite the micrometer screw 31 a pin 34 supported in the top 11 of the box 10 is mounted. This pin 34 carries a rotatable arm 35 which extends to a position over the protractor card 27 when rotated downwardly and which may be swung about the pin 34 to a position indicated at 37 in Fig. 1 where it is clear of the card 27. The lower end of this arm 35 is provided with a small marking hole 38, which hole 38, when the arm 35 is in the lower position, is exactly in alignment with the center of the protractor card 27. A knob 40 is provided adjacent the lower end of this arm 35 for manually shifting it to either of the two positions. Rotation of the arm 35 downwardly is limited by a stop 41 supported in the top 11 of the box 10 by a screw. In practice, the lens blank 33 to be marked with guide lines for grinding is laid on top of the protractor card 27 and its position then adjusted by means of the micrometer screw 31, after which the arm 35 is swung into the lower predetermined position to mark the exact center of the lens blank 33 with respect to the protracor card 27.

A snap switch 44 is provided in the top 11 of the box 10 for turning the light bulb 24 off or on. The illuminated green screen 15 located above the swivel arm is surrounded preferably by a black nonreflecting surface and it has been found that when a bifocal lens is held in position above this screen 15 a person looking through the lens at the screen 15 as well as the black surrounding surfaces will see the outline of the bifocal portion of the lens quite distinctly. The line of joinder of the fused portions of the lens blank will be brightly illuminated with a light, almost white, line, while the remainder of the lens blank is illuminated with a slight greenish tint of lesser intensity. This screen arrangement is, therefore, particularly useful in examining a lens blank to determine the shape and other qualities as well as the location of the bifocal lens element.

A trough-like depression in the top of the box serves as a rack for holding the blank marking stylus or pen. As shown in Fig. 3 the inkwell 23 comprises a glass jar 45 received in a small compartment 46 containing insulating material 47 to prevent the heat of the lamp bulb 24 from evaporating the ink which is contained in a sponge 48 in the bottom of the inkwell 23. The swivel cover 18 supported by a screw 50 in the top 11 of the box 10 also serves to prevent evaporation of the ink.

The main screen 13, as shown in Fig. 4, is formed of two pieces 13 and 13a of transparent plastic material and a small piece of metallic foil 51 having high reflective properties such as aluminum or tin foil. As shown in Fig. 4 the major piece of the screen 13 is cut out as indicated at 52, the inner end 53 of the cutout portion 52 being beveled at an angle approximately 40° and the metallic foil being cemented to the beveled surface formed. After the foil 51 has been cemented in place the second piece 32a of the screen 13 which is cut to the exact shape of the cutout portion 52 is cemented in place so that the resulting screen 13 comprises a transparent sheet of plastic material having a small rectangular piece of foil 51 disposed approximately at a point slightly to one side of its center. The function of this foil 51 is best shown in Fig. 5. White rays of light from the lamp bulb 24 enter the polished end of the screen and pass through it until they strike the metal foil and are reflected upwardly. Thus a beam of white light indicated at 55 emerges from the top surface of the screen 13. The remainder of the screen is lighted by green light which passes through the filter screen 22 inside the box 10 and impinges on the frosted surface being transmitted upwardly through the screen 13. When a bifocal lens 33 as illustrated in Fig. 5 is positioned so that the top edge 56 of the bifocal portion 57 lies in the path of the emerging white light beam 55 a portion of this light is reflected toward the eyes of the person using the device from the interface of the hard glass and soft glass as indicated by the single beam 58. Thus when a bifocal lens blank 33 has been located over the center of the protractor card 27 and the bulb 24 is lighted, the top edge 56 of the bifocal element 57 appears to the operator as a bright light line. He then adjusts the position of the blank 33 by means of the adjusting screw 31 and the parallel crosswise lines 60 on the protractor card 27 until the top of the bifocal portion 57 is located the exact number of millimeters below the center of the lens as that particular prescription requires. Similarly the lens blank 33 may be shifted to the right or left so that the bifocal element 57 is centered properly with respect to the lens center or is the prescribed distance off center. When this has been done the operator takes the marking stick (not shown) and marks the center of the lens blank 33 to be used in laying out and grinding the lens. The arm 35 is then swung upwardly clear of the protractor card 27 and a curved ruler 61 which may be formed of any suitable flexible material such as leather or plastic as shown in Figs. 6 and 7 is used to lay out angles determined from the protractor card 27. The ends of this ruler 61 extend beyond the lens blank 33 and lie flat against the protractor card 27 while the upwardly curving central portion lies flat against the top surface of the lens blank 33. Thus a diameter at any desired angle may be easily laid out on the blank by placing the two ends of the ruler 61 along the proper radial lines of the protractor card 27 and using the pan (not shown) to scribe a line on the blank as guided by the edge of the ruler 61.

After the blank 33 has been marked with the required guide lines in red ink, it is removed from the device and cemented to a steel holder by means of pitch. The red lines are thus readily visible against the black background of the pitch, and since they are on the convex side of the blank which is secured to the holder, they are not removed during grinding which is carried out on the concave side.

When the blank 33 has been ground to the required shape, it is removed from the supporting block and, after the pitch and markings have been cleaned off, returned to the layout device for marking of the lines to be used as a guide in cutting off the edges to the finished lens shape.

Usually the protractor card 27 is removed and replaced by a card having different markings thereon which markings are used to mark a line on the blank corresponding to the exact periphery of the spectacle lens. For this operation the bifocal element 57 must be exactly located, as directed by the prescription, so that it will be in the proper position in the finished lens.

The procedure in laying out the edge-cutting guide lines is similar to that used for the grinding lines, in that the lens blank 33 is placed in the illuminated protractor card 27 and the top edge of the bifocal element 57, located by the white line indicated by the beam 58, is shifted by the micrometer adjustment screw 31 until the bifocal element 57 is exactly positioned with respect to the card 27. The marking pen (not shown) is then used to lay out the contour lines, and the blank 33 is removed for cutting and subsequent installation in the spectacle frame.

From the foregoing it will be apparent that the layout device of this invention both greatly simplifies and increases the accuracy with which a spectacle lens blank, particularly in the case of a bifocal lens blank, can be laid out with guide lines for the lens grinding operation as well as for the subsequent edge cutting operation. This greater speed and accuracy is due largely to the fact that the human judgment factor is reduced to a minimum, making more precise measurements possible and reducing the possibility of error.

It will also be apparent to those familiar with the art that various changes or modifications may be made in the embodiment of the device described without departing from the spirit of this invention, whose scope is defined by the following claims:

What is claimed is:

1. A layout device for bifocal lens blanks comprising an opaque box having an opening in the top surface thereof, a screen of transparent material disposed in said opening, a source of light within said box disposed adjacent one edge of said screen, a second colored screen disposed within said box so that light from said source must pass through said screen before striking the bottom of said first mentioned screen, and a reflecting surface integral with said first mentioned screen for reflecting a portion of the light entering the edge of said first mentioned screen upwardly, said surface being disposed some distance from said edge of said screen and making an acute angle with respect to the surfaces of the screen.

2. A layout device for bifocal lens blanks comprising an opaque box having an opening in the top surface thereof, a screen of transparent material frosted on its lower side disposed in said opening, a source of light within said box disposed adjacent one edge of said screen, a second colored screen disposed within said box so that light from said source must pass through said screen before striking said lower side of said first mentioned screen, and a reflecting surface integral with said first mentioned screen and disposed some distance from the edge of said screen for reflecting a portion of the light entering the edge of said first mentioned screen upwardly, the reflecting surface making an angle less than a right angle and greater than one-half a right angle with the top of said first mentioned screen, and being of such width and height as to make the segment boundary in a bifocal lens blank resting on the screen clearly visible.

3. A device of the class described comprising a transparent screen having its bottom side frosted, a source of polychromatic illumination disposed adjacent a polished edge of said screen, means for filtering a portion of the light from said source to produce monochromatic light which impinges on the bottom of said screen, a reflecting surface in said screen disposed at an acute angle with respect to the surface of the screen and at a distance from said polished edge thereof for reflecting light entering said polished edge of said screen upwardly, and a bifocal lens blank on top of said screen movable with respect to said screen, said reflecting surface being of sufficient area to cast a beam of light upon the segment boundary between the bifocal lens element and the remainder of the blank making the boundary clearly observable.

4. A device of the class described comprising a transparent screen, a source of polychromatic illumination disposed adjacent one edge of said screen, means for filtering a portion of the light from said source to produce monochromatic light which impinges on the bottom of said screen, and a reflecting surface in said screen disposed at an acute angle with respect to the surface of said screen and at some distance from the edge thereof for reflecting light entering said edge of said screen upwardly, said reflecting surface extending a distance laterally and vertically through said plate sufficient to make possible observation of the segment boundary in a bifocal lens blank supported on the screen.

JOHN H. LINE.

REFERENCES CITED

The following references are of record in the file of this patent:

UNITED STATES PATENTS

| Number | Name | Date |
| --- | --- | --- |
| 1,161,882 | Pettengill | Nov. 30, 1915 |
| 1,164,795 | Emerson | Dec. 21, 1915 |
| 1,320,542 | Gilbert | Nov. 4, 1919 |
| 1,336,040 | Mathewson | Apr. 6, 1920 |
| 1,622,776 | Fisher | Mar. 29, 1927 |
| 1,931,477 | Allen | Oct. 24, 1933 |
| 1,977,446 | Long | Oct. 16, 1934 |
| 2,104,079 | Kahn | Jan. 4, 1938 |
| 2,247,737 | Weeks | July 1, 1941 |
| 2,413,198 | Stewart | Dec. 24, 1946 |